Patented Jan. 1, 1929.

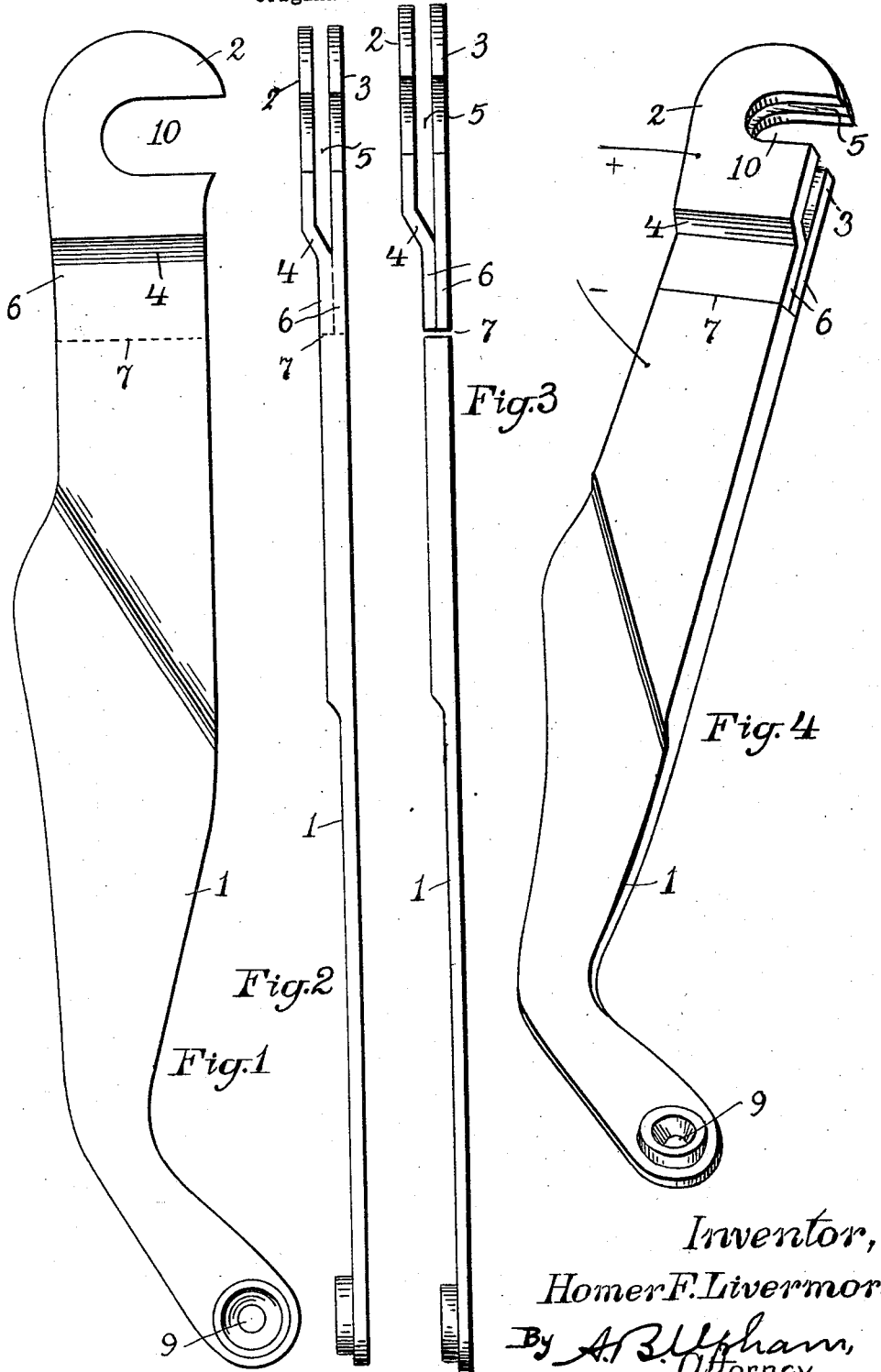

1,697,773

UNITED STATES PATENT OFFICE.

HOMER F. LIVERMORE, OF BROOKLINE, MASSACHUSETTS.

PROCESS OF MAKING VIBRATOR CONNECTERS FOR LOOMS.

Application filed March 17, 1927, Serial No. 176,216. Renewed June 9, 1928.

In the manufacture of vibrator connecters, it is customary to produce the same by drop forging into the general form desired, and then to mill a slot in one end. I have found it to be practically impossible to produce them in this way with perfect accuracy. Either the metal at the slotted end will be too thick or too thin, and the slot therein will be cut with unequal thicknesses of metal beside it; or the metal will shrink unequally and the length of the connecter will be incapable of being maintained.

The object of this invention is the production of a connecter which shall not be open to these objections.

In the drawings forming part of this specification, Fig. 1 is a face view of a vibrator connecter made by my process. Fig. 2 is an edge view of the same. Fig. 3 is an edge view of the parts unassembled. Fig. 4 is a perspective view of the connecter parts being assembled.

In the production of the connecter, the part 1 is a forging, but the parts 2, 3 are stamped from sheet metal, the part 2 being offset at 4 to produce the slot 5, and the shank portions 6 being spot-welded together in a well known manner.

The parts 2, 3 being thus welded together, and the parts themselves being from sheet metal of uniform thickness, not only the latter are of equal thickness, but the slot 5 is of proper size and produced with only a fraction of the cost of a milling operation.

The united parts 2, 3 are then connected with one pole of a suitable electric current, and the part 1 is connected with the other pole, and the same pressed together at the juncture 7. This fuses the parts together, and the pressure is continued until the center of the hole 9 and the center of the notch 10 have been brought to the proper distance apart; for the part 1 is originally made slightly longer than is theoretically necessary, to permit the pressure upon the fused metal to shorten the same to bring the total length of the connecter to the exact dimension desired.

In this manner, the vibrator connecter is produced with perfect accuracy in dimensions, and at a reduced cost as compared with all former methods.

The longitudinal compression of the fused metal will, of course, cause it to laterally expand; such exudation being later easily ground off.

Another and most important feature of the process is that not only do I get the members 2 and 3 of exactly equal thickness, but I can provide a metal of largely increased wear-resistance, since it permits of forming them from cold-rolled sheet steel; whereas a drop-forging not only fails to give accuracy, but wears away altogether too rapidly.

What I claim as my invention is:

The process of producing vibrator connecters, consisting in stamping two parts to form a slotted member having the ends of their shanks flush, electric-welding said ends to the end of a third part and pressing said parts together sufficiently to bring their total length to the desired length, the parts being originally made longer than estimated to permit the pressure upon the fused metal to suitably bring the same to the required dimension.

In testimony that I claim the foregoing invention, I have hereunto set my hand this 15 day of March, 1927.

HOMER F. LIVERMORE.